United States Patent
Marzok et al.

(10) Patent No.: US 9,074,870 B2
(45) Date of Patent: Jul. 7, 2015

(54) METHOD AND DEVICE FOR SINTERING AN OBJECT WHILE DETERMINING THE GEOMETRIC SURFACE PROFILE OF THE OBJECT

(75) Inventors: Ulrich Marzok, Berlin (DE); Ralf Müller, Berlin (DE); Reinhard Schadrack, Berlin (DE); Michael Krauhausen, Aachen (DE)

(73) Assignees: BAM Bundesanstalt Fuer Materialforschung und- Pruefung, Berlin (DE); Nokra Optische Prueftechnik und Automation GmbH, Baesweiler (DE)

( * ) Notice: Subject to any disclaimer, the term of this patent is extended or adjusted under 35 U.S.C. 154(b) by 791 days.

(21) Appl. No.: 12/993,438

(22) PCT Filed: May 19, 2009

(86) PCT No.: PCT/EP2009/056055
§ 371 (c)(1),
(2), (4) Date: Nov. 18, 2010

(87) PCT Pub. No.: WO2009/141337
PCT Pub. Date: Nov. 26, 2009

(65) Prior Publication Data
US 2011/0069301 A1    Mar. 24, 2011

(30) Foreign Application Priority Data

May 19, 2008  (DE) .......................... 10 2008 024 731

(51) Int. Cl.
| | | |
|---|---|---|
| *G01J 5/48* | (2006.01) | |
| *G01B 11/02* | (2006.01) | |
| *B22F 3/10* | (2006.01) | |
| *F27B 21/00* | (2006.01) | |
| *G01B 11/30* | (2006.01) | |

(52) U.S. Cl.
CPC ................ *G01B 11/026* (2013.01); *B22F 3/10* (2013.01); *B22F 2999/00* (2013.01); *F27B 21/00* (2013.01); *G01B 11/306* (2013.01)

(58) Field of Classification Search
CPC ...... G01B 11/24; G01B 11/25; G01B 11/026; G01B 11/306
USPC ........ 250/330–334, 336.1, 338.1, 340, 341.1, 250/341.6, 341.8, 352, 393, 395, 250/559.04–559.08, 559.19, 250/559.22–559.24, 559.26, 559.27, 250/559.29–559.31, 559.36, 559.42, 250/559.46, 559.48, 206.1, 206.2, 216, 250/234–236, 491.1; 356/601, 602, 608, 356/612, 614, 623, 625, 626, 630, 631, 634, 356/399, 400, 426, 428, 3.01–3.09, 43, 606, 356/607, 635; 702/127, 130, 134, 135, 136, 702/155, 158, 159, 166, 167, 170
See application file for complete search history.

(56) References Cited

U.S. PATENT DOCUMENTS

| | | | | |
|---|---|---|---|---|
| 3,578,437 | A * | 5/1971 | Higuchi | 75/383 |
| 4,264,208 | A * | 4/1981 | Haberl et al. | 356/609 |
| 4,315,771 | A * | 2/1982 | Bobillon | 75/458 |
| 4,322,627 | A * | 3/1982 | Pirlet | 250/559.23 |
| 4,339,664 | A * | 7/1982 | Wiklund et al. | 250/577 |
| 4,588,297 | A * | 5/1986 | Inazaki et al. | 356/602 |
| 5,270,560 | A * | 12/1993 | Cheng | 250/559.23 |
| 5,546,176 | A | 8/1996 | Jokinen | 356/5.1 |
| 5,779,696 | A * | 7/1998 | Berry et al. | 606/16 |
| 6,046,812 | A | 4/2000 | Baik et al. | |
| 6,369,401 | B1 | 4/2002 | Lee | |
| 6,421,132 | B1 * | 7/2002 | Brajovic | 356/602 |
| 6,542,248 | B1 * | 4/2003 | Schwarz | 356/600 |
| 6,922,251 | B1 * | 7/2005 | Kirchhoff et al. | 356/601 |
| 2005/0081602 | A1 * | 4/2005 | Feichtinger | 73/31.05 |

FOREIGN PATENT DOCUMENTS

| | | |
|---|---|---|
| DE | 195 04 126 | 8/1996 |
| DE | 10309544 A1 | 9/2004 |
| EP | 0 506 005 | 9/1992 |
| EP | 506005 A2 * | 9/1992 |
| EP | 05006005 A2 | 9/1992 |
| GB | 1 228 480 | 4/1971 |

| | | | |
|---|---|---|---|
| GB | 1228480 A | 4/1971 | |
| JP | 2001-099615 | 4/2001 | |
| KR | 682283 B1 | * 2/2007 | |
| WO | 02/16866 A1 | 2/2002 | |

OTHER PUBLICATIONS

Farcy, R. et al., Triangulating Laser Profilometer as a Navigational Aid for the Blind: Optical Aspects, Applied Optics, vol. 35, No. 7 (Mar. 1, 1996), pp. 1161-1166.*

Halioua, Maurice et al., Automated 360 Profilometry of 3-D Diffuse Objects, Applied Optics, vol. 24, No. 14 (Jul. 15, 1985), pp. 2193-2196.*

Raether, F. et al., Optical Dilatometry for the Control of Microstructure Development During Sintering, Mat. Res. Innovat., vol. 4 (2001), pp. 245-250.*

Shellabear, M. et al., DMLS—Development History and State of the Art, Presented at LANE 2004 Conference, Erlangen, Germany (Sep. 21-24, 2004), 12 pages.*

Xing, Yangchuan et al., In Situ Light-Scattering Measurements of Morphologically Evolving Flame-Synthesized Oxide Nanoaggregates, Applied Optics, vol. 38, No. 12 (Apr. 20, 1999), pp. 2686-2697.*

Raether, F. et al., A Novel Thermo-Optical Measuring System for the In Situ Study of Sintering Processes, Journal of Thermal Analysis, vol. 53 (1998), pp. 717-735 [online], [retrieved on Dec. 21, 2012]. Retrieved from the Internet URL: http://link.springer.com/content/pdf/10.1023%2FA%3A1010111023658.*

Cheng, Xiao-Xue, Automated Measurement Method for 360° Profilometry of 3-D Diffuse Objects, Applied Optics, vol. 30, No. 10 (Apr. 1, 1991), pp. 1274-1278.*

Hancock, John A., Laser Intensity-Based Obstacle Detection and Tracking, Carnegie Mellon Univ., The Robotics Institute, CMU-RI-TR-99-01 (Jan. 26, 1999), p. 24 [online], [retrieved on Jan. 12, 2013].*

Raether, F., R. Hofmann, G. Müller, and H. J. Sölter. "A novel thermo-optical measuring system for the in situ study of sintering processes." Journal of thermal analysis and calorimetry 53, No. 3 (1998): 717-735.*

Hancock, John A., Laser Intensity-Based Obstacle Detection and Tracking, Carnegie Mellon Univ., The Robotics Institute, CMU-RI-TR-99-01 (Jan. 26, 1999), p. 24.*

F. Raether et al. "Optical dilatometry for the control of microstructure development during sintering", Mat Res Innovat (2001) vol. 4, pp. 245-250.

International Search Report, issued Aug. 3, 2009 for PCT International Application No. PCT/EP2009/056055.

Office Action for German Patent Application No. 102008024731.6 dated Mar. 7, 2013.

European Search Report (EP 14154848.7) dated Mar. 13, 2014 (8 pages).

* cited by examiner

*Primary Examiner* — Tri Ton
*Assistant Examiner* — Willie Merrell, II
(74) *Attorney, Agent, or Firm* — Dicke, Billig & Czaja, PLLC

(57) ABSTRACT

The invention relates to a method and a device for sintering objects by means of time-resolved detection of two- or three-dimensional surface profiles and, optionally, by means of temperature measurement in a high temperature furnace on the basis of optical measurement methods. During sintering, each surface point on an object can be measured for its position and, optionally, its temperature, and a change can be determined by successive measurements. The measured change additionally permits control of the sintering regime.

The method comprises the steps of: placing an object 4 into a high temperature furnace 5; heating the furnace 5; generating a two- or three-dimensional surface profile at least of a sub-region of the object 4 by: irradiating the object 4 with light from a light source 2a; detecting the light scattered by the object 4 with the aid of a detector 2b; determining the geometric surface profile from the detected light.

9 Claims, 4 Drawing Sheets

-- Prior Art --

-- Prior Art --

METHOD AND DEVICE FOR SINTERING AN OBJECT WHILE DETERMINING THE GEOMETRIC SURFACE PROFILE OF THE OBJECT

CROSS-REFERENCE TO RELATED APPLICATIONS

This application is a National Phase Application of PCT International Application No. PCT/EP2009/056055, International Filing Date May 19, 2009, claiming priority of German Patent Application, DE 10 2008 024 731.6, filed May 19, 2008, both of which are incorporated by reference herein.

FIELD OF INVENTION

The invention relates to a method and a device for sintering an object, in particular ceramic or powder metallurgical components. In particular, the sintering is performed by means of time-resolved detection of surface data and, optionally, by means of temperature measurement in a high temperature furnace on the basis of optical measurement methods. Specifically, laser triangulation can be used to determine the geometry of the object, and pyrometry to determine the distribution of the surface temperature.

Powder metallurgical and ceramic components are mostly formed from initial powders with the addition of water and organic additives. The most varied shaping processes are used in this case. After drying and burning out the additives, the porous shaped bodies, so-called green bodies, are compacted and solidified in a subsequent burning process, the sintering.

Depending on the shaping process selected, for example injection molding or 3D printing, it is possible to produce shapes of complex geometry and, also, heterogeneously structured components, for example ceramic multilayer substrates by means of tape casting, screen printing and lamination processes. The sintering of components is applied, in particular, for very hard, wear-resistant and thermostable materials, since in this case other shaping processes are very expensive and complicated.

BACKGROUND OF INVENTION

Apart from being based on their good mechanical and thermal properties, the multifarious application of sintered components is also based on the great variety of further advantageous properties such as, for example, the good chemical and corrosion resistance of ceramic materials, which also enables good compatibility with living tissue or an exactly adaptable resorbability of bone substitute materials. Other applications of ceramic materials result from their electrical properties such as their good insulation and specific ferro- or dielectric properties.

The extensive range of adjustable microstructures and/or combinations of properties, the achievable complex component geometries and the good possibilities for combination with other materials have had the effect that ceramic materials often enjoy a key role in the development of new products. Alongside the classic applications of ceramic components, for example as a heating element, insulator, ball bearing and as a seal, it is also the case that medical applications, for example as a substitute for bones, teeth and joints, as well as applications in microsystem technology are increasingly occurring, ceramic materials enabling the construction of more complex multilayer wiring substrates with multifarious integrated functionalities, in the last mentioned applications. Such components are, for example, increasingly being used in the automobile industry and in information and medical technologies. In particular, modern innovative applications of ceramic materials do, however, place very high demands on their reliability—that is to say, the variation of the desired properties—as well as on the precision of the component geometry.

In the case of sintered components, the shape and size as well as the achievable material properties and their variation are inextricably bound up with the processes for their production. It is therefore decisive for the quality of the end product for these processes to be controlled as precisely as possible. This control is therefore a substantial precondition for the market introduction of ceramic components, and influences the present day technological progress in a decisive way.

Particularly in the case of green bodies of inhomogeneous porosity, complex geometry, or with a heterogeneous material construction, it is possible for local differences to occur during compaction. The sintered component then differs from the green body not only with reference to size, but also as regards its shape. In order to correct such effects, increasing use is being made nowadays of 3D sintering simulation tools, for example on the basis of finite element methods, in order to predict the 3D sintering behavior. The findings obtained can then be used, for example, to adjust the shape of the green body such that the sintered component assumes the desired shape.

In addition, in the case of green bodies of inhomogeneous porosity, complex geometry or with a heterogeneous material construction, upon compaction it is also possible for temporary local differences to result, which need not be recognizable from the shape of the fired component. Thus, for example, the different shrinkage during sintering of a multiply film composite can result in temporary distortions. Such temporary warpings during sintering, or else just the formation of stresses in the sintered body can later cause microstructural inhomogeneities such as, for example, the formation of faults in the fired component, and thus lead to breakage or to some other type of failure of the component.

The increasing demands being placed on the precision and reliability of sintered components are therefore urgently necessitating novel methods for controlling the sintering process in a fashion integrated therewith and/or in situ, with such methods also being capable of detecting very slight and complex shape changes as well as local temperature differences of the surface during the sintering process in a precise way, that is to say down to the μm region. This information can then be used to optimize the production of shaped bodies, to the assessment and development of 3D sintering simulation tools or to the control of the sintering process itself.

As a rule, however, industrial sintering processes have so far proceeded without in-situ control of the shrinkage, this being done subsequently. Only individual measured variables such as temperature are measured in the furnace interior, evaluated or used as controlled variable. At present, even the assessment and optimization of 3D simulation tools, which can, after all, predict the entire sintering process, is still based on the measurable properties of the finished or partially sintered component.

Concerning in-situ control of shrinkage, the application of optical silhouette methods by means of a heating microscope and image evaluation is known in the research—see, for example, F. Raether, R. Springer, S. Beyer: Optical dilatometry for the control of microstructure development during sintering; Mat Res Innovat (2001) 4, p. 245-250. FIG. 5a shows the principle of the silhouette method of the prior art. A sample 104 with, for example, a circular cross section is irradiated from one side by a light source 102a. In the example, the sample 104 has a central depression on the surface facing the light source 102*a*. The light source 102*a* irradiates the sample 104 from one side. On the side of the sample 104 opposite thereto, a CCD camera is arranged as detector 102*b*. It receives the light from the light source 104 that passes the sample. Wherever the sample 104 blocks the beam path between the light source 102*a* and detector 102*b*, a shadow of the sample 104 is produced on the CCD camera 102*b*. As shown in FIG. 5*b*, the basic shape of the sample 104 is obtained as a silhouette, as a result. In the example, this is merely an undifferentiated circle without information relating to the depression of the surface of the sample 104. The silhouette method can be used to carry out only two-dimensional shrinkage measurements on small, simple and, in particular, convexly curved samples, for example a 30 mm high cylinder with a diameter of 11 mm, where the silhouette can supply sufficient information relating to the sample shape. Since the silhouette constitutes the projection of the light-dark boundary of the object onto the observation plane, it includes no information relating to the distance of this line, and thus relating to the actual spatial profile and the length of said boundary. Only in the case of regularly shaped objects and accurately defined imaging conditions such as, for example, a sphere, is it possible to reach a conclusion as to the actual surface profile of the object and its spatial shape indirectly from the silhouette. The term "indirectly" indicates here that with this method it is necessary to make assumptions relating to the shape of the object. The description of irregular shape changes, for example the complex warpings of large-format sintered films, for example in the 8"×8" format, is impossible with the silhouette method.

Non-contact optical methods for in-situ detection of the three-dimensional geometry of bodies even at high temperatures are known in conjunction with other technical tasks not included in sintering technology. These are based on the method of triangulation. It is mostly a laser that is used here as light source. An electronic image converter, mostly a CCD camera, then records the scattered light. FIG. 6*a* shows an example of the principle of the measurement of the scattered or backscattered light. Once again, a circular sample 104 with a depression in its surface as in FIG. 5*a* is irradiated from one side with a light source 102*a*. By contrast with the silhouette method, the light source 102*a* and detector 102*b* are now arranged on the same side of the sample 104 at a certain distance and/or angle from one another. Light strikes the sample 104, is backscattered and passes into the detector 102*b*. The surface profile of the sample 104 can now be generated from the intensity of the detected (back) scattered light. This is shown in FIG. 6*b* and includes information relating to the differentiated structure of the surface of the sample 104 with the depression.

U.S. Pat. No. 4,588,297 A describes a method as to how it is possible by means of triangulation to determine the filling level of the bulk material fed for the melt in a blast furnace. The filling level is determined in this case by means of pulsing a laser beam on the surface, while the angle of the emitter to the surface is varied incrementally along a prescribed path. The scattered light is then measured by means of a detector with a small aperture angle. The detector and emitter are arranged in this case at a fixed spacing. Points along the profile are determined from the emission and reception angles and the known distance between the emitter and detector. To this end, the laser and light receiver are located outside the furnace in front of the observation windows. Since the laser and receiver do not form a rigidly connected unit, but are fitted separately on the furnace, and the incidence angle of the laser beam is adjusted in small angle steps during measurement in order to determine a profile, the calibration of this arrangement is difficult and, moreover, very susceptible to faults, for example owing simply to the thermal expansion of mechanical components of the sensor fastening during heating. The measuring accuracy of the arrangement is therefore very limited.

JP 2001-099615 describes a water-cooled triangulation sensor that operates with green laser light and is arranged directly in a high temperature furnace. The measurement of the surface of poured-in waste incineration material is known as one application. In order to be able to measure the visible surface of an object, adjustable parameters in the case of this sensor are the inclination of the laser beam and the inclination of the optical axis of the optical receiver in relation to a fixed coordinate axis. From these variable operating angles, the other fixed geometric optical parameters of the arrangement and the image coordinates of the image of the laser spot in the CCD camera, the 3D coordinates of the point emitted by the laser onto the object surface are determined within an evaluation unit for each angular setting. However, there are strict physical resolution limits which, given a discrete camera chip, are related to the distance between the measurement object and camera and the angle between the incident laser beam and the optical axis of the camera. The continuous angular tracking inherent in this method entails different resolutions and is therefore unsuitable for high accuracies in the μm region. Furthermore, the large distance between the surface to be measured and the detector has a disadvantageous effect on the accuracy in the case of this arrangement and also in the case of the first-mentioned measurement in a blast furnace.

At room temperature, arrangements are known in which the measurement object is rotated at the same time as the optical sensor is displaced linearly over the measurement object. Thus, U.S. Pat. No. 5,270,560 A describes a method that can be used to measure semiconductor wafers with a laser sensor. DE 195 04 126 A1 describes a method for measuring three-dimensional objects by optical triangulation, which can be used in shoe last measurement, in mold construction and in orthopedic, technical dental and archaeological applications.

However, there is to date no possibility for the direct and sufficiently accurate quantitative detection of two- or three-dimensional surface profiles of the object and changes relevant thereto during the sintering process at high temperatures. There is not as yet any method for the monitoring and control of the sintering of ceramic and powder metallurgical components in a high temperature furnace that includes a direct two- or three-dimensional shape recognition and shape analysis during the heating process.

SUMMARY OF THE INVENTION

It is therefore an object of the invention to specify a device and a method for sintering ceramic and powder metallurgical components with the aid of which it is possible to carry out accurate measurements of surface profiles of sintering objects in the case of which the thermal conditions in the furnace are influenced only minimally.

The invention relates to a method and an arrangement for sintering components that is based on the time-resolved measurement of surface profiles or shape features derived therefrom which are obtained from the light directly scattered by the sample. Consequently, it is possible during the sintering to measure the position and temperature of each surface point, and to determine a change by successive measurements. Optionally, it is also possible to determine the temperature of the surface. The measured change furthermore permits control of the sintering regime and/or of the time profile of the temperature distribution via the targeted control of various heating zones.

A method is therefore proposed for sintering an object that comprises the steps of: placing an object into a high temperature furnace; heating the furnace; generating a surface profile at least of a subregion of the object by: irradiating the object with light from a light source; detecting the light scattered by the object with the aid of a detector; determining the geometric surface profile from the detected light.

During the generation of the geometric surface profile, it is optionally possible at the same time to determine the thermal surface profile at least of a subregion of the object.

Furthermore, sintering parameters can be controlled on the basis of the geometric and/or thermal surface profiles obtained for the object.

Geometric surface profile is understood below as two- or three-dimensional data of the geometry or the shape of the surface.

It is preferred to use optical laser triangulation to determine the geometry, and pyrometry to determine the distribution of the surface temperature, that is to say the radiation thermometer is preferably an optical pyrometer. The object to be sintered is preferably a ceramic or powder metallurgical object.

The set of sintering parameters comprises: the local and global temperature in the furnace, the global heating rate in the entire furnace, the local heating rate of individual heating zones in the furnace, and the duration of individual sintering steps.

A control and evaluation unit calculates the geometric and/or thermal surface profile of the object preferably from the measured geometric and/or thermal data.

Between successive determinations of the geometric and/or thermal surface profile at least of a subregion of the object, changes between the surface profiles, on the basis of which sintering parameters are controlled, are preferably determined. This enables the determination of irregularities during sintering, and an adaptation, carried out thereafter, of the sintering parameters or a termination of the method.

The geometric changes advantageously comprise shrinkages and/or contractions which often occur during sintering. The shrinkages of the object can be determined by tracking and determining the distance between predetermined points on the object from detections of the geometric surface profile made one after another in time.

Furthermore, the method can comprise: determining characteristics for shape recognition and temperature distribution from the measured geometric and thermal surface profiles of the object, carrying out a desired/actual comparison of the measured values of the characteristics with predetermined values; correcting the sintering parameters when a deviation of the measured values of the characteristics from predetermined values is greater than a first predefined threshold value; and continuing the determination of the geometric and thermal surface profiles of the object and the characteristics as long as the sintering process is not yet concluded. It is also possible to provide a termination of the sintering process in the event of a deviation of the measured values of the characteristics from a predetermined value that is greater than a second predefined threshold value. The characteristics comprise various shrinkage dimensions such as, for example, the lateral and axial shrinkage, geometric deviations and temperature differences. The characteristics can comprise the smallest and the largest measured temperature values.

The angle between the light source and detector is preferably constant, a very accurate measurement thereby being achieved.

In one exemplary embodiment, the light source and detector and/or the radiation thermometer are preferably moved over the object. Even more preferably, the radiation thermometer and light source and detector are moved together over the object. The method preferably proceeds in such a way that firstly the generation of the geometric and/or the thermal surface profile is performed through a gap in the wall of the furnace. The radiation thermometer, light source and detector are guided over the object in a lateral direction along the gap. The object is simultaneously rotated in the furnace, linear and rotating movement being performed synchronously. The linear movement can be performed by a means for linear positioning which is designed to be displaceable along the gap and on which the light source, detector and radiation thermometer are arranged one after another in the movement direction. The rotating movement is performed by means of a rotary table on which the said object is arranged. The rotating movement can be performed by means of a rotary table. A translation step along the gap is preferably performed after a complete rotation of the object. The light source, detector and radiation thermometer can preferably be moved from an outer point of the rotary table up to the center of rotation of the rotary table. This enables the readjustment of the zero point of the measurement in z-direction, since the surface of the rotary table is also measured at the same time.

The light source and detector are preferably implemented by a laser triangulation sensor that images a laser light spot onto the surface of the object and detects the light scattered by the spot in a position-sensitive detector.

In another exemplary embodiment, the step of irradiating with light can further comprise an expansion of the light beam from the light source to form a line. The linear movement along the gap can thereby be omitted.

Furthermore, in another exemplary embodiment the light source can be a projector that projects a two-dimensional pattern onto the surface of the object. The detector can be implemented by at least one camera that records the projected pattern. The method then further comprises the step of determining the difference between projected and recorded patterns.

According to the invention, there is further specified a device for controlling the sintering of an object that comprises: a high temperature furnace in which the object is held and heated, at least one opening being formed in the wall of the furnace; a light source and a detector for detecting the light scattered by the surface, the light source and detector being arranged in the outer region of the furnace in such a way that the surface profile of the object can be determined through the opening.

Furthermore, it is possible as an option to provide a means for determining the thermal surface profile at least of a subregion of the object in the furnace. The means for determining the thermal surface profile is preferably a radiation thermometer.

Moreover, in a further exemplary embodiment an evaluation and control unit can be provided for evaluating the measured geometric. The evaluation and control unit preferably also serves to control sintering parameters on the basis of these geometric and thermal data.

The object is preferably a ceramic or powder metallurgical object.

The set of controllable sintering parameters can comprise the local and global temperature in the furnace, the global heating rate in the entire furnace, the local heating rate of individual heating zones in the furnace, and the duration of individual sintering steps.

The control and evaluation unit can determine shrinkage dimensions, geometric deviations and/or temperature differences as a function of which the sintering is controlled.

The angle between the light beam from the light source and optical axis of the light detector can be constant, it being possible as a result to achieve a high accuracy.

The radiation thermometer can be an optical pyrometer.

The opening can be a gap, the radiation thermometer, light source and detector can be arranged displaceably on a means for linear positioning along the gap, and a means for rotating the object is designed in the furnace in such a way that the movement of a means for linear positioning and means for rotating the object is performed synchronously. The radiation thermometer, light source and detector can be arranged one after another in the movement direction on the means for linear positioning. The means for rotating the object can be a rotary table driven by a motor. The gap can be covered by a thermostable plate that allows the light from the light source to pass without hindrance and is transparent for the radiation thermometer.

In a first exemplary embodiment, the light source and detector can be implemented by a laser triangulation sensor, the radiant intensity of the laser exceeding that of the object during sintering.

In another exemplary embodiment, the light source can be a projector that projects a two-dimensional pattern onto the surface of the object, and the detector can be at least one camera that records the projected pattern.

In another exemplary embodiment, a light beam from the light source can be expanded to form a line, and the light source and detector can be designed as a laser section sensor.

The high accuracy of the determination of the surface profile is achieved by a small measuring spot of the light source, preferably the laser, and a small distance measuring range—both associated with a certain proximity of the sensor to the sample—and the synchronization of the relative movement in relation to the sample. The triangulation sensor is arranged directly above the gap in the wall of the furnace.

The main application is, firstly, multilayer substrates made from films, on which the advantages of controlled sintering are to be demonstrated.

A sintering process of ceramic components can be directly tracked, monitored and controlled for the first time with the aid of the method and the measuring arrangement. To this end, the 3D data and the temperature distribution of the object surface are recorded over the entire process duration.

A specific solution to this task consists in measuring the profile of a ceramic measurement object located on a rotary table in the furnace interior with the aid of a laser displacement sensor arranged over a very narrow gap in the furnace roof, or of a laser triangulation sensor. This approach advantageously largely meets the thermal requirements of the measuring task and enables a large measuring area in conjunction with a very small viewing area.

Fault events such as, for example, the deformation of the component or excessively large temperature differences are detected at once. The sintering process can in this case be terminated or slowed down. The permanent recording of the geometry and temperature data renders it possible, in addition, to draw conclusions on fault causes, and thus to improve the course of the sintering process, but also of the previous production technology.

Shrinkage parameters of interest—lateral and axial shrinkages in the case of thin ceramic films, are made available to the furnace operator and component manufacturer from the geometry data. It is thereby possible, in particular, to optimize the heating control in critical temperature ranges.

BRIEF DESCRIPTION OF THE DRAWINGS

The invention is illustrated in more detail below with the aid of exemplary embodiments and the use of drawings, in which.

The term "geometric surface profile" used below is used in the following text for two- or three-dimensional data of the surface of the object. Consequently, the shape of the surface or, in other words, the spatial form of the surface is represented by these data. For example, the term can cover surface data of the object along a line, or else the complete three-dimensional surface shape of the object. In the two-dimensional case, the geometric surface profile specifies, for example, the dependence of a height or distance coordinate z on a spatial coordinate x, that is to say $z(x)$ and, in the three-dimensional case, the shape of the surface z as a function of two spatial coordinates, that is to say $z(x,y)$, for example. In this context, the term "geometric surface profile" or "geometry of the surface" is to be used below for short. By contrast therewith, the thermal surface profile additionally yields an item of temperature information relating to the respective geometric surface profile.

Figure 1:
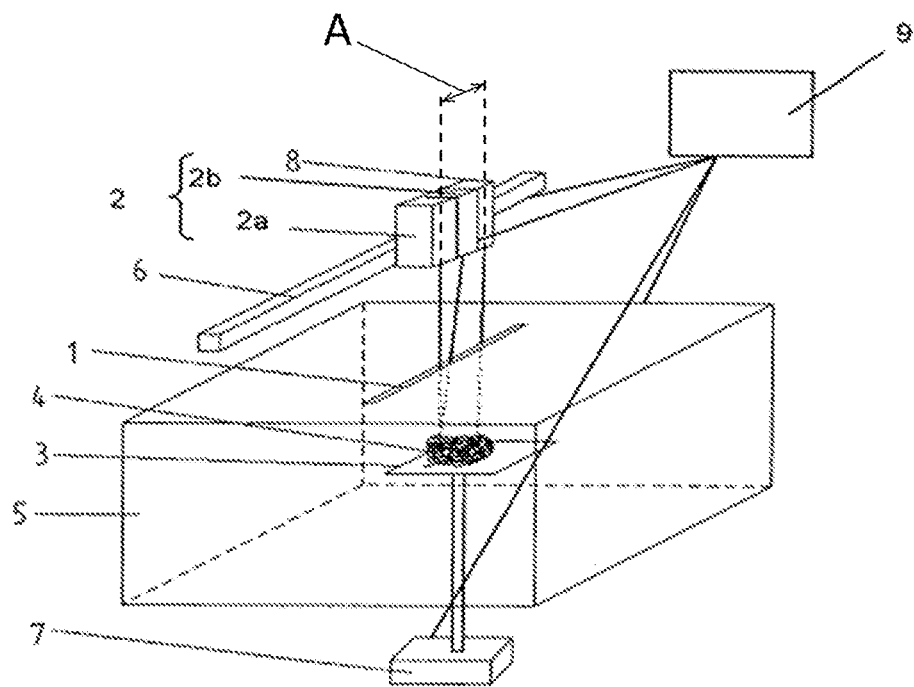
FIG. 1 shows an inventive exemplary embodiment of the device for sintering by means of 3D shape recognition and pyrometric measurement of the temperature distribution on the surface of the object to be sintered.

FIG. 1 shows an exemplary embodiment of an inventive device for sintering objects 4, preferably ceramic or powder metallurgical objects 4.

DETAILED DESCRIPTION OF THE INVENTION

Sintering is a process of firing and consolidating bodies that are shaped from powder particles. Sintering is very frequently accompanied by a shrinkage. The powders can be: (a) oxidic powders such as, for example, $Al_2O_3$ for sodium vapor lamps, $ZrO_2$ for fracture-tough structural ceramic, gas sensors, $BaTiO_3$ for capacitor and thermistor ceramic, $3Al_2O_3.SiO_2+SiO_2+K_2O.3Al_2O_3.SiO_2$+silicate glass for porcelain; (b) nonoxidic powders, such as, for example, SiC for high-strength structural ceramic, $Si_3N_4$ for high-strength and fracture-tough structural ceramic; or (c) metallic powders such as, for example, WC+Co or TiN, TiC+Ni, Co, Mo for cemented carbide drills or cemented carbide indexable inserts. The present application is not restricted to the specified examples for ceramic or powder metallurgical materials.

The device for sintering in accordance with the first exemplary embodiment comprises a high temperature furnace 5, in the wall of which an opening, preferably a gap or slot 1, is introduced on one side, preferably the upper side. Located in the interior of the furnace 5 is a holder for the object 4 to be sintered, preferably a table 3. The table 3 is optionally designed as a rotary table on which the sample 4 to be sintered is arranged. The rotary table 3 is then provided with an external drive 7.

A light source 2a and a light detector 2b for measuring the light scattered by the object 4 and for determining the distance from the surface of the object 4 is located over the opening 1, but preferably not in a fashion restricting the gap 1. The light source 2a and light detector 2b are arranged on the same side of the sample in such a way that the light, backscattered directly by the object surface of the sample 4, from the light source 2a enters the detector 2b such that scattered light is measured for the purpose of determining the surface profile. The term "backscattered" light is simplified below to that of "scattered" light. The light source 2a and detector 2b are preferably arranged above the same opening in a wall of the furnace 5. Furthermore, the light source 2a and detector 2b are preferably arranged on a line or an arc of a circle above the sample. The light source 2a and the detector 2b are implemented by a laser triangulation sensor 2 in the exemplary embodiment. The triangulation sensor 2 is connected to a means for the linear positioning of the micropositioning unit 6. In a preferred exemplary embodiment, a means for determining the temperature at least of a subregion of the surface is also optionally arranged. Said means is preferably an optical radiation thermometer or optical pyrometer. The radiation thermometer 8 can then also preferably be fastened on the means 6 for linear positioning.

The combined use of the laser triangulation sensor 2 and means for linear positioning 6 enables the measurement of a geometric surface profile of the object 4, or the two- or three-dimensional coordinates of the surface points of the object 4. In a preferred but not restrictive fashion, the triangulation sensor 2 and radiation thermometer 8 are arranged in series on the micropositioning unit 6, in a yet more preferred fashion directly alongside and one after another such that it is possible to undertake a measurement of the temperature of the triangulated surface point of the ceramic or powder metallurgical object or sample 4.

The micropositioning unit 6 is arranged in this case at the gap 1 in the furnace 5 such that the triangulation sensor 2 and, optionally, the radiation thermometer 8 can be guided over the gap 4 for the purpose of completely measuring the ceramic sample 4 on the rotary table 3, that is to say along its lateral extent. In other words, the sample 4 is scanned in the direction of the gap 1, while the micropositioning unit 6 extends along the gap 1 and moves the triangulation sensor 2 and, optionally, the radiation thermometer 8 over the gap 1, and thus the sample 4.

The gap 1 in the wall of the furnace 5, preferably in the roof of the furnace 5, should be as narrow as possible in order to hold down thermal problems. The gap width preferably smaller than or equal to 5 mm in this case. The length of the gap 1 corresponds at least to the entire length of the lateral extent of the object 4, more preferably to at least half the length of the lateral extent. The gap 1 is to be designed such that the beam paths of the triangulation sensor 2 and pyrometer 8 can pass through the gap without interference.

For the purpose of further thermal shielding, the opening 1 can preferably be covered with a silica glass plate that withstands the prevailing temperatures and at the same time allows the laser light for the triangulation and the wavelength for the pyrometric measurement to pass. However, the opening 1 can also be designed in an oval or in some other shape. All that need be ensured is that the object 4 can be measured, and that the cross-sectional area of the opening 1 is small by comparison with the surface of the furnace 5 such that the temperature in the furnace 5 remains capable of being controlled, and a homogeneous temperature distribution is achieved.

A means for synchronizing rotational movements of the rotary table 3 and translational movement of the triangulation sensor 2 and of the radiation thermometer 8 is provided on the inventive device. This can be a mechanical means, but is preferably implemented by a control and evaluation device 9. The control and evaluation unit 9 is connected in this case to the means for positioning 6, the rotary table 3 and its drive 7, the laser triangulation sensor 2 and the radiation thermometer 8. In a preferred refinement, the control and evaluation unit 9 is further also connected to the furnace control of the furnace 5. It is thereby possible to control the temporal temperature profile and the level of the temperature, as is explained in more detail further below. Furthermore, the control and evaluation unit 9 evaluates the measured data of the triangulation sensor 2 and of the radiation thermometer 8, and generates a three-dimensional surface profile of the ceramic or powder metallurgical object 4, as well as a temperature surface profile of the ceramic or powder metallurgical object 4.

The turntable with rotary table 3 is preferably fabricated from thermostable material that does not deform, the rotary table 3 being of flat design.

Apart from being distinguished by its precision, a preferred laser triangulation sensor 2 is distinguished by a laser intensity that exceeds the radiant intensity of glowing ceramic so that it can be detected in the detector 2b. It is therefore suitable for measuring even on hot ceramic surfaces. The laser beam and the optical axis of the camera in this case preferably form a constant angle. The fixed angular setting advantageously supplies approximately equal measuring conditions for distances within the measuring range, and an advantage in accuracy over the triangulation solutions known in the prior art.

The image plane of the triangulation sensor 2, the camera chip, is in this case preferably in accordance with the Scheimpflug condition such that the laser spot is sharply imaged inside the measuring range. The Scheimpflug rule states that, upon imaging, the image, objective and focusing planes intersect in a common line of intersection.

The optical axes of the radiation thermometer 8 and triangulation sensor 2 are in this case preferably aligned parallel to one another, and have a constant offset A in the radial translation r occurring perpendicularly thereto, such that points on the surface of the object 4 that are slightly displaced from one another can be measured by the triangulation sensor or radiation thermometer 8. Since the offset A is constant, it can be calculated out when evaluating the measured data, and a temperature can therefore be assigned to a surface point on the object 4.

The temperature range in which the method is applied extends from room temperature to 1000° C. and above. In this case, there is already a substantial inherent radiation of the ceramic or powder metallurgical measurement object 4, whose intensity is, however, exceeded by the laser intensity.

In order to detect a point on the surface of the ceramic or powder metallurgical object 4, the laser triangulation sensor 2 projects a light point onto the surface of the ceramic measurement object 4 and images the (back) scattered light via a lens in a position-sensitive measuring element or detector 2b. The light source 2a and detector 2b are arranged in a fashion integrated in the triangulation sensor 2.

In order to detect the surface geometry of the ceramic or powder metallurgical object 4, the radial translation of the laser triangulation sensor 2 located outside the furnace is performed with the aid of a micropositioning unit 6, arranged over the very narrow rectilinear gap 1 in the furnace roof, in the direction of the extent of the gap 1. The linear translation of the laser triangulation sensor 2 determines through the means for linear positioning 6 a high profile of the measurement object 4 in the plane in which the light beam from the light source 2a is displaced during the translation.

In order to detect an entire three-dimensional surface profile of the ceramic or powder metallurgical object 4, the object is additionally rotated at the same time with angular accuracy. This is done by means of the rotary table 3 arranged under the gap or slot 1. The rotation of the ceramic or powder metallurgical measurement object 4 results in a three-dimensional image of the surface of the measuring surface from the individual profile measurements. In this case, the movements of the radial positioning unit 6 and the rotation of the rotary table proceed in a synchronized fashion.

Without the translation of the light source 2a, detector 2b and radiation thermometer 8 as well as rotation of the object 4, only one point of the surface is "scanned". The recording of a partial profile or a subregion of the surface or of the surface profile of the object 4 can be sufficient for some applications, for example, in a region that is critical for the functioning of the workpiece to be shaped, or at the location of a rupture joint. The inventive detection of a partial profile of the surface differs from the previously usual silhouette method in that light scattered directly by the sample is used. This permits the measurement of surface profiles even in regions that cannot be adequately detected by the silhouette such as, for example, the surface of not completely convexly shaped or cuboid objects, or the detection of complex distortions of sintering ceramic films. For other applications, it is necessary to examine the entire workpiece 4 during the sintering.

An advantageous effect of the rotation of the rotary table 3 is the compensation of temperature differences in the ceramic or powder metallurgical measurement object 4 that are caused by temperature gradients in the interior of the furnace 5.

The ceramic or powder metallurgical object 4 on the rotary table 3 is preferably rotated at constant angular speed, the triangulation sensor 2 triangulating points on the surface of the ceramic object 4 continuously or in small discrete steps. At the same time, the temperature of the surface of the ceramic object 4 is measured by the radiation thermometer 8. After one revolution, the radial positioning unit 6 is radially displaced by one increment, thus resulting in the measurement of a new track on the surface of the ceramic object 4 by the radiation thermometer 8 and triangulation sensor 2. The triangulation sensor 2 is displaced radially from the edge of the ceramic object 4 toward the center of rotation of the rotary table 3, as a result of which the surface is completely measured once.

The radial translation and measurement preferably start at the edge of the rotary table 3 or at least from the edge of the sample 4 on the rotary table 3 so that the zero position of the rotary table 3 can be determined again and again. The measured geometric data of the ceramic or powder metallurgical measurement object and of the surface of the rotary table not covered by the measurement object are preferably firstly specified in cylindrical coordinates r, phi, z, the radius r and the azimuth angle phi describing the coordinates of a point in a plane (polar coordinates), and z describing the associated height of the point perpendicularly above or below the plane of the polar coordinate system. After a coordinate transformation, the z-coordinate of the measurement object always relates to the turntable surface (z=0). The thermal expansion of the turntable is therefore compensated in the z-direction by measurement.

The temperature profile of the ceramic or powder metallurgical measurement object 4 located on the turntable 3 is measured with the aid of the optical pyrometer 8 arranged outside the furnace 5 over the very narrow rectilinear gap 1 in the furnace roof. The optical pyrometer 8 is preferably arranged over the gap 1 fixedly in series with the laser triangulation sensor 2 on the same micropositioning unit 6. After the distance between the triangulation sensor 2 and parameter 8 has been calculated out, a corresponding temperature value T(r, phi, z) results for each surface point P[r, phi, z]. The object surface is thereby completely described geometrically and thermally.

The ceramic or powder metallurgical measurement object 4 is scanned during the continuous translational movement of the sensor 2 and the rotation of the turntable 3. It is advantageous to have a compound spiral movement or a circular movement with a translation step after each revolution. The surface of the object is calculated in a control and evaluation unit in the context of the step widths of translation and rotation from a complete scan of the object surface, for example after the traversal of a complete spiral from an outer point on the turntable 3 up to its center of rotation.

Geometric changes to the ceramic or powder metallurgical measurement object 4 are determined from surfaces determined sequentially in time, or else individual dimensions such as, for example, an edge length of a component. Said changes are to be understood as deformations and distortions of the object, as well as contractions or shrinkages typical of sintering.

Of course, it is also possible to start by carrying out a translational movement over the length of the gap, which results in the scanning of a section of the ceramic or powder metallurgical object 4 that is followed by an incremental angular change and a renewed translation until the surface has been completely scanned.

The surface of the ceramic or powder metallurgical object 4 is scanned continuously during sintering by the triangulation sensor 2 and the radiation thermometer 8, it thereby being possible to determine a change in the surface during the sintering 4.

It is described below how the shrinkage can be calculated during the sintering with reference to the example of a ceramic film. It is preferred in this case to use thin ceramic films in the 8"×8" format. However, the device is not restricted to the use of films, it being possible, rather, to use any possible shapes and sizes that the furnace 5 can accommodate.

Figure 2:
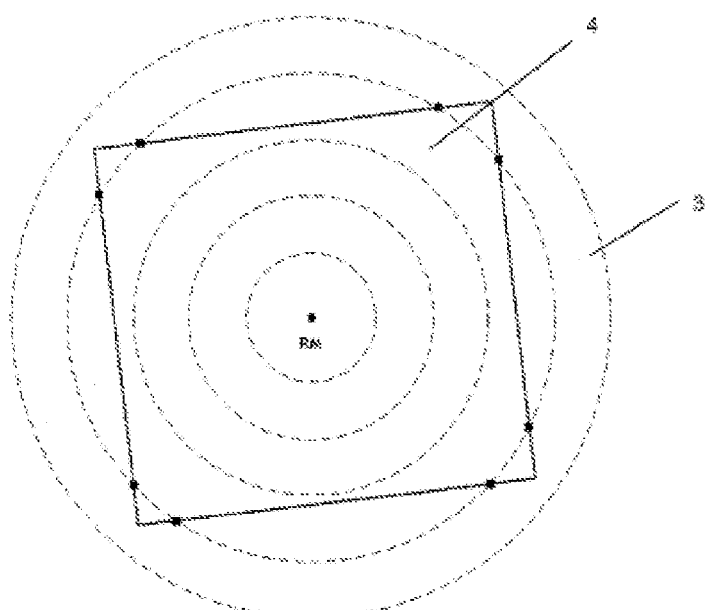
FIG. 2 shows a schematic of an exemplary embodiment of the determination of the lateral shrinkage of films.

As shown in FIG. 2, a lateral shrinkage of the ceramic object 4 is determined from the tracking and determination of the distance between specific points on the ceramic measurement object P(r, phi), for example corners and edge points at which the z-coordinate changes discontinuously. In the case of rectangular ceramic films, it is possible to calculate a circumscribing quadrangle with the aid of a single circular revolution, the sensor being required to detect all film edges. The lateral shrinkage of the film is determined from calculations of the circumscribing quadrangle from calculations performed sequentially in time.

In the measuring process with the aid of the laser triangulation sensor 2, the edges of the ceramic film 4 constitute a jump in the measuring signal. If two jumps per film side are detected in the event of a circular scan of rectilinear edges, it is possible to determine the circumscribing quadrangle and its corner points therefrom. The side lengths of the ceramic film 4 follow from the spacing of adjacent corner points of the calculated circumscribing quadrangle. It is also possible to detect a corner point at once in the case of circular scanning, but this is difficult during measurement because of discrete circular radii. The point RM in FIG. 3 specifies the center of rotation of the turntable. The lateral shrinkage between two instants 1 and 2 is then, for example, calculated from the change in a side length of the film:

$$s_{lateral} = (L_1 - L_2)/L_1.$$

If the instant 1 is the starting point, and the instant 2 the end of the sintering process, $s_{lateral}$ is consequently the total lateral shrinkage of the film 4.

The determination of the lateral shrinkage of films 4 is advantageously particularly quick, during only one revolution of the rotary table 3.

Figure 3:
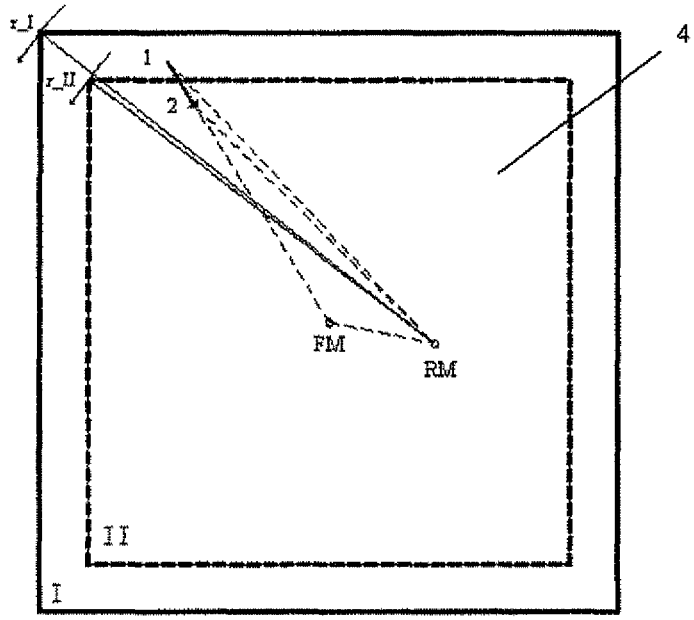
FIG. 3 shows a schematic of an exemplary embodiment of the determination of the axial shrinkage.

The axial shrinkage in the thickness direction of the film is determined from the measurement of the z-coordinates of monitoring points permanently associated with the film surface, as shown in FIG. 3. The term "axial" relates to the rotational axis about which the object is rotated. The r-phi coordinates of these selected points must be iteratively tracked with the lateral shrinkage. The axial shrinkage is determined from z-values of the numbered film points determined sequentially in time. Here, "axial" means the shrinkage in the direction of the rotational axis of the rotary table 3, that is to say the shrinkage of the object 4 in the z-direction or that of its thickness.

In the case of the lateral shrinkage, that is to say in the x- or y-directions, of the ceramic film 4, a point permanently anchored on the film "migrates", on the specific assumptions, from position 1 to position 2 in the coordinate system of the rotary table 3 (along a beam from the film centerpoint in the case of isotropic shrinkage). Since the point is not "seen", its position must be calculated from the lateral shrinkage. This position must be reached by sensor translation and angular setting of the turntable. For the axial shrinkage, the distance, that is to say z-coordinate, is measured with the aid of the laser triangulation sensor for each new point position.

Mark I and II in FIG. 3 in this case symbolize the film size at two sequential instants. The point FM is the center of the rectangular film 4, while the point RM specifies the center of rotation of the rotary table 3. $r_{-I}$ and $r_{-II}$ indicate different circular tracks during the measurement, at which corner points or film edges are detected. The axial shrinkage between two instants 1 and 2 is calculated from the change in a vertical distance measurement (height, thickness)—that is to say, the z-coordinate of a fixed point on the film:

$$s_{axial} = (z_1 - z_2)/z_1.$$

If the instant 1 is the starting point, and the instant 2 the end of the sintering process, $s_{axial}$ is therefore the total axial shrinkage of the ceramic film 4.

FIGS. 2 and 3 show the determination of the lateral and axial shrinkage of ceramic films 4. The shrinkages can, however, be calculated for any desired shape of the object—FIGS. 2 and 3 relate merely to one exemplary embodiment.

In the case of structured ceramic objects 4, for example having printed conductor tracks and holes, it is possible to detect local, spatially inhomogeneous shrinkage processes quantitatively with the aid of the size and position of these features relative to one another.

In another exemplary embodiment (not shown), no means for linear positioning 6 is provided. Instead of this, a light beam is expanded to form a line and directed onto the object 4. The expanded light beam is then preferably implemented by a laser light section sensor. It is advantageous in this case that the laser beam is expanded to form a line in the case of the laser light section sensor, and that the profile is therefore determined directly along this line such that there is no need for translation of the light source 2a and detector 2b. However, since the laser light is sharply imaged on the camera chip only in the plane that from the optical axis of the laser projection unit and the optical axis of the camera, and can lose some focus toward the lateral edge in the image because of the depth of focus and line width of the laser line, a resolution less than that associated with the preferred laser triangulation sensor is dictated by the physics. The laser light section sensor can, however, be used nevertheless for sintered objects of prominent height, for example having a length, width and height of approximately one order of magnitude. For very thin films with film thicknesses that are, for example, much smaller than the length and breadth, it is, by contrast, laser triangulation that is preferred.

In a further exemplary embodiment (not shown), the geometric surface profile can be carried out by means of a strip projection method. In this case, in a photogrammetric method the light source 2a is implemented by a projector as an inverse camera, and the detector 2b is implemented by a camera.

The projector operates in this case with a power that exceeds the existing radiation of the incandescent surface in the furnace 5. One opening 1 in the furnace 5 would respectively be required for each camera and projector. The surface can be recorded by stereo photography using a plurality of cameras.

In a further preferred exemplary embodiment, the sintering process is controlled by the triangulation sensor 2 and the radiation thermometer 8 by means of the geometric and/or thermal data of the surface of the measuring object that are measured continuously during sintering.

Figure 4:
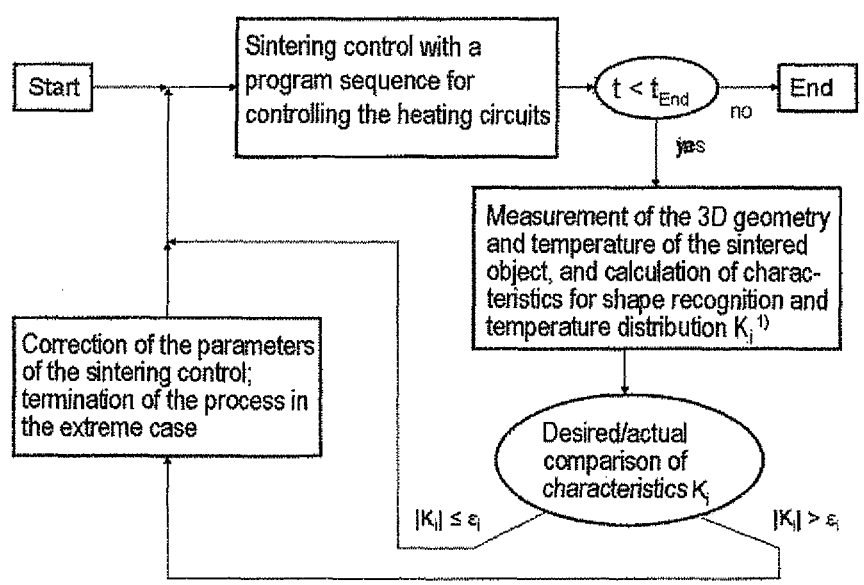
FIG. 4 shows an exemplary embodiment of a method according to the invention for controlling sintering by means of 3D shape recognition and pyrometric measurement of the temperature distribution on the surface of the object to be sintered.
Figure 5A:
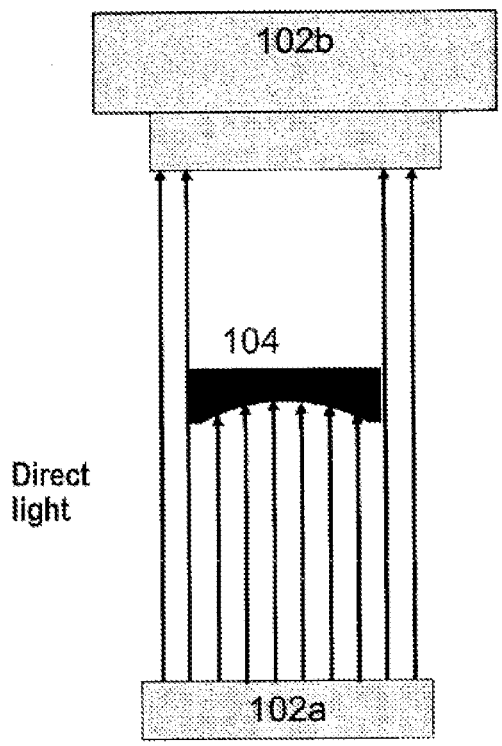
FIG. 5 shows the principle of the silhouette method of the prior art (FIG. 5a: setup.
FIG. 5b: measurement result)
Figure 5B:
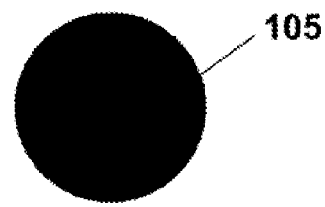
Figure 6A:
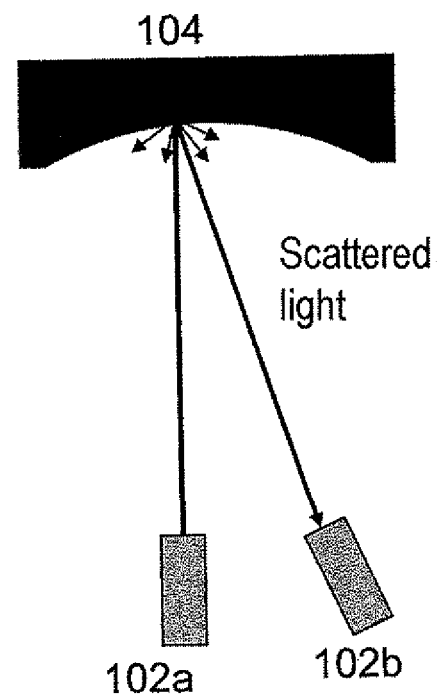
FIG. 6 shows the principle of the scattered light method of the prior art (FIG. 6a: setup.
FIG. 6b: measurement result).
Figure 6B:
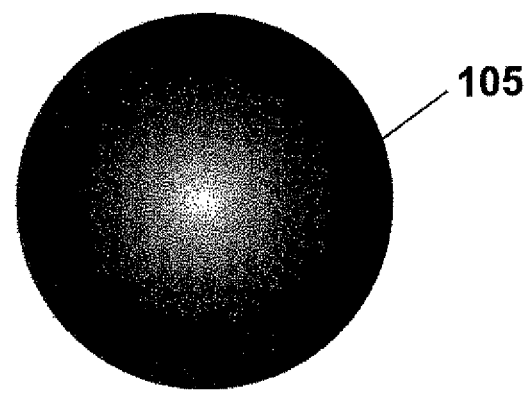

Control of the sintering can proceed in this case as shown in FIG. 4. Different heating zones of the furnace 5 are preferably controlled here separately or jointly by means of separate heating circuits. However, it is also possible to control only the global temperature in the furnace.

The sintering is carried out by controlling the sintering parameters. The sintering parameters in this case comprise the local and global furnace temperature, the duration of individual sintering steps, and the local or global heating rate $\Delta T/\Delta t$ in the furnace or in furnace segments or heating zones, $\Delta T$ being the change in the temperature in a time interval $\Delta t$. The implementation of the inventive device with the positioning unit 6 and rotary table 3 also makes it possible to control the rotary speed of the rotary table 3 and the speed of translation of the positioning unit 6. Furthermore, the duration of individual steps of the sintering, or the sintering as a whole can be controlled.

According to the invention, the geometric and thermal surface profile at least of a subregion of the surface of the object 4 are used to control the sintering. After the object 4 has been placed in a high temperature furnace 5, the furnace is heated. The three-dimensional geometric surface profile of at least a subregion of the object 4 is then generated, light from a light source 2a being irradiated onto a point on the surface of the object, the scattered light being detected in a detector 2b, and the geometric surface profile then being determined therefrom. At the same time, the thermal surface profile of at least a subregion of the object 4 is generated by means of a radiation thermometer 8, and these profiles are then used to control the sintering parameters.

As described above, the complete surface of the ceramic object 4 is in this case preferably scanned continuously. The process is terminated if the prescribed duration of the sintering is exceeded, otherwise it continues to be carried out. In order to control the sintering it is preferred during the sintering process to determine characteristics for shape recognition and the temperature distribution of the ceramic or powder metallurgical object 4, which characteristics comprise, for example, shrinkage dimensions, geometric deviations and temperature differences. These characteristics for shape recognition and temperature distribution are determined from the measured geometries and temperatures of the ceramic or powder metallurgical object 4. This preferably takes place in the control and evaluation unit 9. For example, the lateral shrinkage can be determined as set forth above.

After each determination of characteristics, a desired/actual comparison of the measured values is carried out with the aid of predetermined values. The parameters of sintering control are corrected whenever the absolute value of the deviation of the measured values of the characteristics $K_i$ from the predetermined values is greater than a first predefined threshold value $\in_i$ for this characteristic. The determination of the geometries and temperatures of the ceramic or powder metallurgical object 4 for the purpose of renewed determination of characteristics for shape recognition and temperature distribution is continued whenever a deviation of the measured values of the characteristics $K_i$ from the predetermined values is smaller than the first predefined threshold value, or a correction is performed and at the same time the sintering process has not yet been concluded. If, for example, a local warping is recognized, the heating power of one or more heating zones is reduced, that is to say the heating rate $\Delta T/\Delta t$ is reduced. The same also holds for shrinkage dimensions between two successive measurements that exceed a threshold value, or the maximum temperature difference on the surface exceeds a permissible amount. If no prominent shape changes are determined for a long time, the heating rates of the individual heating zones can also be increased in a coordinated fashion.

It is also possible to determine a second threshold value for the relevant characteristic $K_i$ that is larger than the first threshold value for which the sintering is terminated completely upon the threshold value being exceeded. The sintering program is terminated after expiry of the predetermined time in the case of the normal progression.

The surface temperature of the ceramic or powder metallurgical object 4 represented, for example, by the smallest and the largest temperature values on the surface thereof, the shrinkage parameters and/or temperature values of thermocouples additionally arranged in the furnace interior are used to regulate and optimize the heating of the furnace 5 during operation with the aid of the evaluation and control unit 9.

The process is particularly important for the furnace temperature range in which the shrinkage processes essentially take place. For example, glass matrix composites consisting of bariumalumoborosilicate glass and $\alpha$-$Al_2O_3$ powders shrink chiefly in the temperature range of 700 to 900° C.

Since a temperature profile of the surface of the ceramic or powder metallurgical object 4 can be measured in accordance with the invention, this temperature profile can be used for the purpose of local control of the heating circuits so that the ceramic object 4 can be fired as uniformly as possible. Thus, for example, a temperature difference in the furnace 5 can be compensated by changing the heating rates with the aid of the control and evaluation unit 9. Moreover, the temperature profile in the furnace 5 can be adapted upon incipient warpings.

Furthermore, the measured data can also be used to control the translation speed of the sensor 2 and radiation thermometer 8, and to set the rotational speed of the rotary table 3. At the beginning of the measurement, a slower movement can suffice or even be necessary, since the ceramic object 4 is not yet sufficiently solid. A quicker speed for quicker measurement of the variations may then subsequently be required in the temperature range of the shrinkage.

While the sintering process is running—that is to say, under high temperature conditions in a fashion integral in the process while in situ—the first step is to use optical sensors to measure the surface profiles of the component together with its temperature distribution continuously and in a time resolved fashion with the required accuracy from the light scattered directly by the object. The sintering process or preceding technical steps are controlled with the aid of characteristics that are determined from these measurements. Faults such as the deformation of the part to be sintered are recognized immediately. In addition to the monitoring and regulation of routine processes, this solution can be used to develop and optimize methods for producing and sintering new materials.

The recording of all the geometric and thermal surface parameters renders it possible to track and analyze sintering processes of ceramic or powder metallurgical high performance elements, and to correct the course of the sintering as well as, if necessary, to undertake targeted changes to the layout of these assemblies.

The specified method and the device render it possible for the first time to measure a ceramic or powder metallurgical object 4 in time resolved fashion for all 3D coordinates, including the combination with the temperature distribution resolved in space and time. This also holds true for the shrinkage parameters derived from the complete measurement. With this measurement, it is possible to control the sintering process precisely, or else to terminate it before excessively large deformation of the starting materials.

Again, the application of individual elements of the above described exemplary embodiment can enable substantial advantages in the control of sintering processes. Thus, the detection of a fixedly arranged line profile during the sintering process provides important information relating to the sintering process such as, for example, the film width or indications of an incipient warping. It is possible in this case to dispense with the use of a rotating sample holder. The same applies to the use of the pyrometer. The linear profile can be restricted to specific critical or representative regions of the object. It is true that variants of the described method that are restricted in such a way supply only restricted information, but in return they offer the advantage of a simpler possibility of implementation under industrial scale conditions and with lower costs.

LIST OF REFERENCE SYMBOLS

1 Opening
2 Means for determining the three-dimensional geometric surface profile
2a Light source
2b Detector
3 Rotary table
4 Sample
5 High temperature furnace
6 Positioning unit for the translation of the sensors over the gap
7 Drive for rotary table with accurate angular positioning
8 Means for determining the thermal surface profile
9 Control and evaluation unit
102a Light source
102b Detector
104 Sample
105 Measurement result
RM Center of rotation
FM Center of the film

The invention claimed is:

1. A device for sintering a ceramic or powder metallurgical object, comprising:
   a high temperature furnace, in which the ceramic or powder metallurgical object is held and heated,
   at least one gap in a wall of the furnace;
   a laser light source; and
   a detector for detecting the light from the laser light source scattered by the ceramic or powder metallurgical object, the laser light source and detector being arranged on the same side of the ceramic or powder metallurgical object in such a way that a surface profile at least of a subregion of the ceramic or powder metallurgical object is determined through the at least one gap on the basis of the laser light scattered by the ceramic or powder metallurgical object,
   wherein the laser light source and detector are implemented by a laser triangulation sensor, which images laser light onto the surface of the ceramic or powder metallurgical object, and
   wherein the laser light scattered by the ceramic or powder metallurgical object is detected by a position sensitive detector through the at least one gap, and
   wherein the light source and the detector are arranged above the at least one gap, further comprising
   a radiation thermometer for determining a thermal surface profile, the thermal surface profile comprising thermal data or thermal and geometric data, at least of a subregion of the ceramic or powder metallurgical object in the furnace, wherein the radiation thermometer, light source and detector are arranged displaceably along the at least one gap on a micro-positioning unit; and
   a rotary table driven by a motor in the furnace which is designed in such a way that the movement of the micro-positioning unit and of the rotary table driven by the motor is performed synchronously.

2. The device as claimed in claim 1, in which sintering parameters are actively controlled, the parameters comprising:
   a local and global temperature in the furnace,
   a global heating rate in the entire furnace,
   a local heating rate of individual heating zones in the furnace, and
   a duration of individual sintering steps.

3. The device as claimed in claim 1, in which the angle between the light beam from the light source and the optical axis of the light detector is constant.

4. The device as claimed in claim 1, in which the radiation thermometer is an optical pyrometer.

5. The device as claimed in claim 1, in which the light source, detector and radiation thermometer are arranged one after another in the movement direction on the micro-positioning unit.

6. The device as claimed in claim 1, in which the gap is covered by a thermostable plate that allows the light from the light source to pass and that is transparent for the radiation thermometer.

7. The device as claimed in claim 1, in which a radiant intensity of the laser of the laser triangulation sensor exceeding that of the object during sintering.

8. The device as claimed in claim 1 wherein the at least one gap comprises precisely one gap.

9. A device for sintering a ceramic or powder metallurgical object, comprising:
   a high temperature furnace, in which the ceramic or powder metallurgical object is held and heated,
   at least one opening in a wall of the furnace;
   a laser light source which images laser light onto the surface of the ceramic or powder metallurgical object; and
   a detector for detecting the light from the laser light source scattered by the ceramic or powder metallurgical object,
   the laser light source and detector being arranged on the same side of the ceramic or powder metallurgical object in such a way that a surface profile at least of a subregion of the ceramic or powder metallurgical object is determined through the at least one opening on the basis of the laser light scattered by the ceramic or powder metallurgical object,
   wherein the laser light source and detector are implemented by a laser section sensor, wherein a light beam from the laser light source is expanded to form a line on the surface of the ceramic or powder metallurgical object,
   wherein the laser light scattered by the ceramic or powder metallurgical object is detected by a position sensitive detector through the at least one opening, and the surface profile is determined directly along the line,
   wherein the light source and the detector are arranged above the one opening;
   a radiation thermometer for determining a thermal surface profile, the thermal surface profile comprising thermal data or thermal and geometric data, at least of a subregion of the ceramic or powder metallurgical object in the furnace, wherein the radiation thermometer, light source and detector are arranged displaceably along the at least one opening on a micro-positioning unit; and
   a rotary table driven by a motor in the furnace which is designed in such a way that the movement of the micro-positioning unit and of the rotary table driven by the motor is performed synchronously.

* * * * *